(12) United States Patent
Jackson (10) Patent No.: US 8,683,269 B2
(45) Date of Patent: Mar. 25, 2014

(54) PROTOCOL SOFTWARE COMPONENT AND TEST APPARATUS

(75) Inventor: Timothy Edward Jackson, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 524 days.

(21) Appl. No.: 13/088,143

(22) Filed: Apr. 15, 2011

(65) Prior Publication Data

US 2012/0266024 A1 Oct. 18, 2012

(51) Int. Cl.
*G06F 11/00* (2006.01)

(52) U.S. Cl.
USPC ......... 714/38.14; 714/38.1; 714/25; 714/47.1

(58) Field of Classification Search
USPC ............... 714/38.1, 38.14, 25, 47.14, 48, 4.1; 709/200, 207; 713/2
See application file for complete search history.

(56) References Cited

U.S. PATENT DOCUMENTS

| | | | |
|---|---|---|---|
| 6,243,832 B1 | 6/2001 | Eckes et al. | |
| 7,032,034 B1 | 4/2006 | Tenneti et al. | |
| 7,191,099 B2 | 3/2007 | Zeng et al. | |
| 7,808,902 B1 | 10/2010 | Pham et al. | |
| 2002/0136165 A1 | 9/2002 | Ady et al. | |
| 2005/0060612 A1* | 3/2005 | Bohan | 714/25 |
| 2005/0144522 A1 | 6/2005 | Aditham | |
| 2005/0222815 A1 | 10/2005 | Tolly | |
| 2005/0286486 A1 | 12/2005 | Miller | |
| 2006/0069942 A1* | 3/2006 | Brasilerio et al. | 714/4 |
| 2006/0250967 A1 | 11/2006 | Miller et al. | |
| 2006/0253812 A1 | 11/2006 | Hildebrant | |
| 2007/0203973 A1 | 8/2007 | Landauer et al. | |
| 2008/0072322 A1 | 3/2008 | Guruswamy | |
| 2008/0282352 A1 | 11/2008 | Beddoe et al. | |
| 2012/0096310 A1* | 4/2012 | Varanasi et al. | 714/15 |

FOREIGN PATENT DOCUMENTS

| | | |
|---|---|---|
| GB | 2433006 A | 6/2007 |
| GB | 2433006 B | 12/2007 |
| WO | 2006081459 A2 | 8/2006 |
| WO | 2011073932 A1 | 6/2011 |

OTHER PUBLICATIONS

UK Search and Examination Report, Dated Aug. 1, 2012, UK Intellectual Property Office, Application No. GB12048338, 9 pgs.

* cited by examiner

*Primary Examiner* — Sarai Butler
(74) *Attorney, Agent, or Firm* — Toler Law Group, PC (57) ABSTRACT

A particular system includes a processor and a network interface configured to send and receive messages via a network using an asynchronous computer communication protocol. The system may include two or more buffers, such as an ingress buffer and an egress buffer. The system may include a memory accessible to the processor. The memory may include first node instructions that are executable by the processor to implement one or more functions of a first node. The memory may also include one or more script callbacks. The script callbacks may be executable by the processor to at least one of provide: the first content to a test script to be modified before the first content is provided to the first node instructions from the ingress buffer, and provide the second content to the test script to be modified before the outgoing message is provided to the egress buffer.

20 Claims, 6 Drawing Sheets

PROTOCOL SOFTWARE COMPONENT AND TEST APPARATUS

FIELD OF THE DISCLOSURE

The present disclosure is generally related to testing devices that communicate via a network.

BACKGROUND

Devices coupled to a network may be tested to determine whether the devices and the network function properly. One manner in which devices may be tested is to connect the devices to the network and then determine whether each device functions for its intended purpose. For example, when one device is configured to operate as a file server to one or more client devices on the network, a file request may be sent to the file server from one of the client devices to determine whether the file server responds by sending a requested file. Correspondingly, to test one of the client devices, a file may be sent from the file server to the client device to determine whether the client device properly receives and acknowledges the file.

For certain systems, testing each device individually in the manner described above may not be sufficient. For example, it may be important to determine whether a failure or an error at one device can cause another device to perform improperly. For another example, it may be important to determine whether a device can withstand an injection attach from a malicious attacker or a weaponized software system that seeks to exploit or compromise the device or a system of which the device is a part.

SUMMARY

Systems, non-transitory computer readable media, and computer-executable methods are disclosed to facilitate testing of nodes on a network that communicate according to a particular protocol. A testing system may be substituted for a particular node on a network. The testing system may include a computer system that is equipped with node instructions that are executable by the testing system to perform functions that would be performed by the particular node. For example, when the particular node functions as a client on the network (e.g., requesting particular data from other nodes of the network), the node instructions may include client instructions that enable the testing system to perform the client functions that would be performed by the particular node. In another example, when the particular node functions as a server on the network (e.g., sending particular data to other nodes of the network), the node instructions may include server instructions that enable the testing system to perform the server functions that would be performed by the particular node. When the particular node performs both server and client functions, the testing system may include corresponding server instructions and client instructions.

The testing system may also include test instructions that enable tampering with the operation of the test system as it simulates the operation of the particular node. The test system may be used to determine tolerance of components of the network (e.g., other nodes) to unexpected messages or other events. To illustrate, the test system may include one or more script callbacks that enable operation of the node instructions to be interrupted and enable a test script to be inserted. The test script may be written to engage a particular script callback and to interrupt ordinary operation of the node instructions (e.g., to simulate an error or delay). For example, a particular script callback and test script may enable modification of content of an ingress buffer that receives inbound data from another node or modification of content of an egress buffer that holds data to be sent to another node. Another script callback may enable a test script to be written that introduces a timing delay in responding to a message, for example, to respond to the message after a designated timeout interval. In another example, script callbacks may be provided that enable a test script to change a session state or session options associated with a communication protocol used by nodes of the network.

In a particular embodiment, a system includes a processor. The system also includes a network interface operably coupled to the processor and configured to send and receive messages via a network using an asynchronous computer communication protocol. The system also includes two or more buffers, including an ingress buffer to store first content corresponding to a received message and an egress buffer to store second content corresponding to an outgoing message. The system also includes a memory accessible to the processor. The memory includes first node instructions that are executable by the processor to implement one or more functions of a first node. The memory also includes one or more script callbacks. The one or more script callbacks are executable by the processor to provide the first content to a test script to be modified before the first content is provided to the first node instructions from the ingress buffer, to provide the second content to the test script to be modified before the outgoing message is provided to the egress buffer, or both.

In another particular embodiment, a non-transitory computer-readable medium stores instructions that are executed by a computer system to cause the computer system to provide first data related to asynchronous computer communications to a test script. The instructions are further executable by the processor to receive modified first data from the test script, where the first data is modified by the test script to generate the modified first data. The instructions are further executable by the processor to generate a first message based on the modified first data. The first message may be sent to a second computer system using an asynchronous computer communications protocol. A second message may be received from the second computer system using the asynchronous computer communications protocol. The instructions are further executable by the processor to store content of the first message and the second message to enable a determination of an effect of communicating the modified first data to the second computer system using the asynchronous computer communications protocol In still another particular embodiment, a computer-executable method receives a first message at a first node from a second node via a network using an asynchronous computer communications protocol. First content of the first message is provided to a first script callback. The first script callback is configured to generate second content by enabling a first test script to modify the first content, to delay generating the second content for a first predetermined time period, or both. The second content is provided to first node instructions, which are configured to respond to the first message from the second node by generating third content. The third content is provided to a second script callback. The second script callback is configured to generate fourth content by enabling a second test script to modify the third content, to delay generating the fourth content for a second predetermined time period, or both. The fourth content is sent to the second node via the network in a second message.

The features, functions, and advantages that are described can be achieved independently in various embodiments or may be combined in yet other embodiments, further details of which are disclosed with reference to the following description and drawings.

DETAILED DESCRIPTION

Embodiments disclosed herein include systems, computer-readable media, and computer-executable methods of testing one or more nodes or one or more sets of node instructions. In a particular embodiment, a testing system is installed in a network in addition to other nodes or in place of one of the nodes. The testing system supports an interface that enables the testing system to communicate with other nodes over the network. The testing system supports a set of node instructions that are executable to perform tasks in response to messages received over the network. For example, the node instructions may implement particular functions of a node of the network that is replaced by the testing system. The testing system also supports a plurality of script callbacks. The script callbacks are configured to receive instructions from test scripts. The script callbacks enable the test scripts to modify content of inbound or outbound messages, to delay presenting messages to the node instructions, to delay delivery of responsive messages generated by the node instructions, to modify session state parameters or session options observed by the first node instructions, or any combination thereof. Using the test scripts, testing personnel can determine whether the node instructions on the testing system or other nodes of the network respond as expected under conditions simulated by the test scripts. To illustrate, the testing personnel may determine whether an error or delay simulated by the test scripts causes an error at another node of the network.

Figure 1:
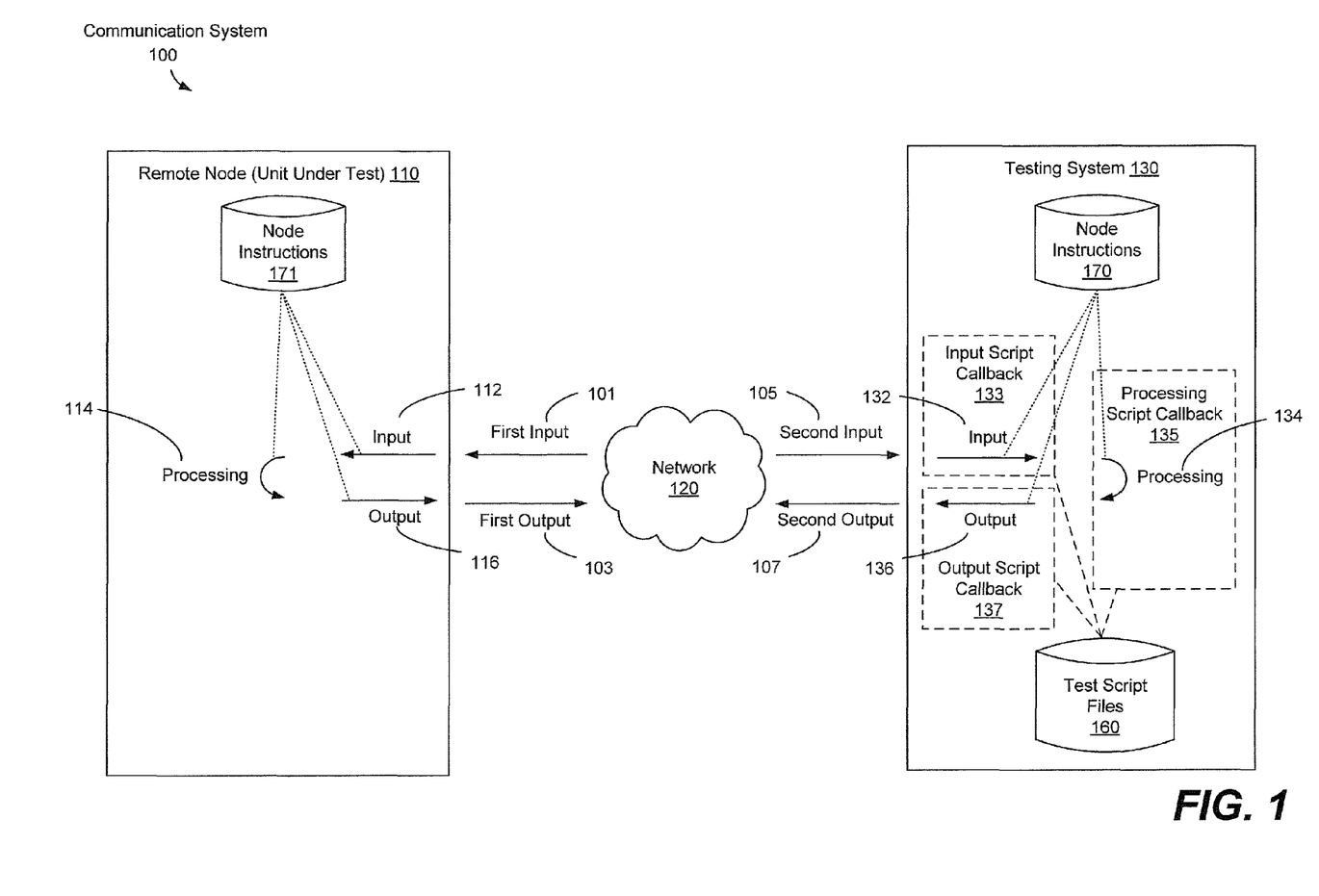
FIG. 1 is a generalized block diagram of a testing system.

FIG. 1 is a generalized block diagram of a communication system 100 that includes a testing system 130 as disclosed herein. The communication system 100 includes the testing system 130 and a remote node 110. The testing system 130 and the remote node 110 communicate via a network 120. The remote node 110 may be a unit under test being evaluated by the testing system 130. As further described below, the testing system 130 joins the communication system 100 as an additional node or replaces another node (not shown in FIG. 1) in the communication system 100.

Operation of the remote node 110 is used to describe general operation of a node in the communication system 100. The remote node 110 receives first input 101 via the network 120 and generates first output 103 that is sent out via the network 120. In a two-node network such as shown in FIG. 1, the first input 101 includes second output 107 generated by the testing system 130. Similarly, the first output 103 will be presented to the testing system 130 as second input 105. However, if there were additional nodes participating in the communication system 100, the inputs 101 and 105 may be received from the additional nodes and the outputs 103 and 107 may be directed to the additional nodes.

Operation of the remote node 110, or any node participating in the communication system 100, generally includes three phases: an input phase 112, a processing phase 114, and an output phase 116. The input phase 112 controls what happens with data that is received via the network 120, such as the first input 101. The processing phase 114 generates a response to the data presented by the input phase 112. The output phase 116 controls the generation of data presented over the network 120 as a result of the processing phase 114, such as the first output 103. Operation of the phases 112, 114, and 116 are controlled by node instructions 171 that include programming that directs operation of the remote node 171.

A problem in the communications system 100 arising at the remote node 110 may occur during any one of the phases 112, 114, and 116. An error in node instructions 171 with respect to any of the phases 112, 114, and 116 or a susceptibility to malicious attack in the node instructions 171 with respect to any of the phases 112, 114, and 116 may cause the remote node 110 to fail. In addition or in the alternative, an error or a vulnerability in the first node 110 may result in the first output 103 causing a failure in another node participating in the communication system 100. Further an error or a vulnerability in the first node 110 may enable a malicious attacker or weaponized software to "highjack" the remote node 110 so that the malicious attacker or weaponized software may use the remote node 110 to attack, disrupt service, or mislead other dependent systems.

The testing system 130 may be used to test whether there are errors or vulnerabilities in the node instructions 171 of the remote node 110. The testing system 130 also may be equipped with node instructions 170 that may be created to control another node in the communication system 100 to test the node instructions 170 for errors or vulnerabilities. In a particular embodiment, the testing system 130 includes a plurality of script callbacks 133, 135, and 137. The plurality of script callbacks 133, 135, and 137 enable one or more test script files 160 to modify operation of one or more of the operation phases 132, 134, and 136 under control of the node instructions 170. Specifically, an input script callback 133 of may enable one of the test script files 160 to modify how the second input 105 is handled by the input phase 132 of the node instructions. A processing script callback 135 may enable one of the test script files 160 to modify how the processing phase 134 responds to a result of the input phase 132. An output script callback 137 may enable one of the test script files 160 to modify how the output phase 136 responds to or communicates a result of the processing phase 134.

Thus, for example, test scripts may be included in the test script files 160 that test how the input phase 132 of the node instructions 170 may respond to data included in the second input 105 that carries unexpected content, is in an unexpected format, or that is presented after an unexpected delay. Test scripts may be included in the test script files 160 to test how the processing phase 134 of the node instructions 170 responds to data tampered with before, during, or after completion of the input phase 132. Test scripts also may be included in the test script files 160 to test how the output phase 136 responds to data tampered with before, during, or after completion of the processing phase 134. Additionally, test scripts may be included in the test script files 160 that modify the second output 107 in terms or content, format, or timing to test how the node instructions 171 at the remote node 110 respond to data that carries unexpected content, is in an unexpected format, or that is presented after an unexpected delay.

In other words, embodiments of the testing system 130 enable the creation and use of test scripts to intercept and modify data at multiple points as it reaches, passes through, and is generated by the testing system 130. As a result, one can test potentially limitless endless combinations of potential errors or attacks that may be made against the remote node 110 or the testing system 130 by modifying or interfering with the handling of data at multiple points in the input phase 132, processing phase 134, and output phase 136 performed at the testing system.

Figure 2:
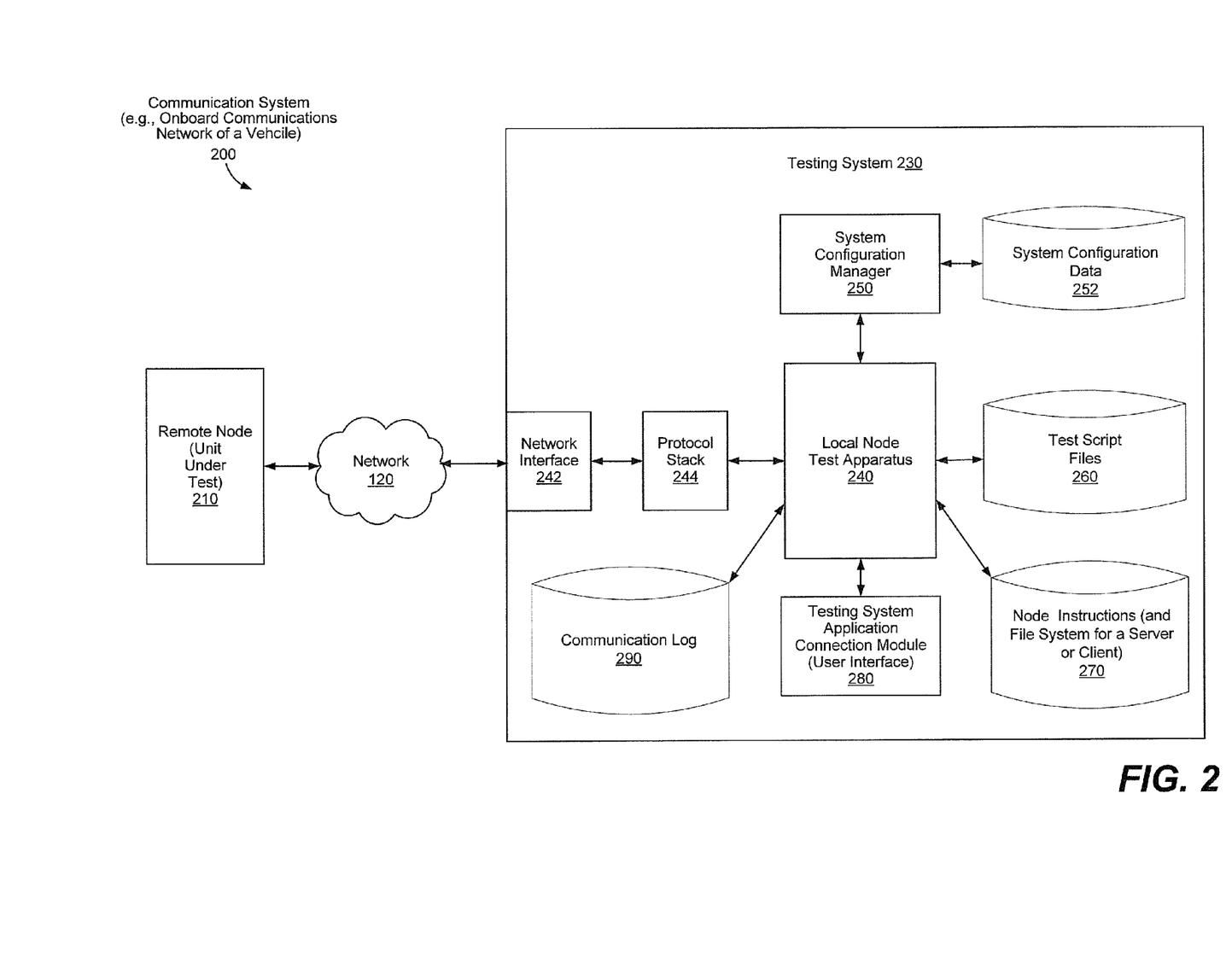
FIG. 2 is a block diagram of an illustrative embodiment of a testing system.

FIG. 2 is a block diagram of an illustrative embodiment of a communication system 200 that includes a testing system 230. The communication system 200, for example, may include an onboard communication network of a vehicle, such as a commercial aircraft or another type of vehicle. The testing system 230 is configured to enable testing of one or more nodes or node instructions communicating via a network 220. The testing system 230 may include a plurality of components, such as a local node test apparatus 240, a network interface 242, a protocol stack 244, a system configuration manager 250, system configuration data 252, test script files 260, node instructions 270, a testing system application connection module 280, and a communication log 290. While these components are illustrated and described as separate functional modules for purposes of clarity of the description, in various embodiments, two or more of the components may be combined. For example, functions of two or more of the components of the testing system 230 may be performed by a processor executing software instructions. In another example, functions of two or more of the components may be performed by special purpose hardware, e.g., an application specific integrated circuit. The communication system 200 may be an operational system in place or being installed in an operational environment. Alternatively, the communication system 200 may represent a model of an operational system whose performance is being evaluated for possible use in an operating environment.

The network interface 242 enables the testing system 230 to communicate via the network 220 with one or more remote nodes such as a remote node 210. The remote node 210 may be configured to operate as a client, as a server, or both. In a particular embodiment, the remote node 210 may be regarded as a unit under test. That is, performance of the remote node 210 may be evaluated based on interactions of the remote node 210 and the testing system 230. In another particular embodiment, the testing system 230 may be configured to test the node instructions 270. The node instructions may be executable to implement functions of a node of the network 220 that is replaced by the testing system 230. For example, the node instructions 270 may include operating instructions for the replaced node and a file system of the replaced node. The node instructions 270 may include server instructions (e.g., instructions to provide data or services to the remote node 210), client instructions (e.g., instructions to request data or services of the remote node 210), or both. The communication log 290 may store messages received from and sent to the remote node 210 as well as output resulting from operation of the node instructions 270. The communications log 290 may also store information indicating modifications that are applied by one or more test scripts of the test script files 260. The communication log 290 thus may be used to evaluate how the remote node 210 or the node instructions 270 respond to modifications applied by one or more of the test scripts of the test script files 260.

As further described below, messages or data communicated via the network 220 may be modified by the local node test apparatus 240 using one or more test scripts of the test script files 260. In a particular embodiment, the local node test apparatus 240 executes the node instructions 270 subject to modifications made by the test script files 260. The local node test apparatus 240 supports a plurality of optional script callbacks, as further described with reference to FIG. 4. The optional script callbacks enable the test script files 260 to modify content of messages received via the network interface 242, to modify messages generated by the node instructions 270, to introduce a timing delay before content of messages is provided to the node instructions 270, to introduce a timing delay in generation of messages by the node instructions 270 before an outgoing message is sent, or any combination thereof. Changes in message content or message timing may affect the response of the remote node 210 or the node instructions 270 in a manner that may expose flaws in the operation of the remote node 210 or the node instructions 270. The optional script callbacks may also or in the alternative enable the test script files 260 to modify one or more protocol parameters recognized by the node instructions 270, such as a protocol state or protocol options for a session. For example, when the nodes communicate using an asynchronous, connectionless protocol, such as a trivial file transfer protocol (TFTP), the testing system 230 may operate as a TFTP client or as a TFTP server. A TFTP session state or "TFTPState" may include a standby state, an init state, an active state, an inactive state, a warning state, or another recognized protocol state. TFTP session options or "TFTPOptions" may include a timeout interval, a blocksize, a transfer size, or another recognized protocol option. Changing the session parameters may cause a corresponding change in a response of the node instructions 270 to a message, which may expose a flaw in the operation of the node instructions 270 or a flaw in the operation of the remote node 210.

The local node test apparatus 240 may be configured by the system configuration manager 250. The system configuration manager 250 configures the local node test apparatus 240 according to the system configuration data 252. The system configuration data 252 may enable the local node test apparatus 240 to be configured to represent a particular type of node or a node operating under particular operating conditions. The local node test apparatus 240 is also responsive to the testing system application connection module 280, which provides a user interface by which operation of the local node test apparatus 240 may be controlled.

The local node test apparatus 240 may receive information from and pass information to the network interface 242 via the protocol stack 244. The protocol stack 244 may be adapted to facilitate inter-node communications via a particular network protocol and transport media.

In operation, the testing system 230 functions as a node in the communication system 200 and communicates with other nodes, such as the remote node 210. The testing system 230 executes the node instructions 270 on the local node test apparatus 240. For example, when the testing system 230 is functioning as a server, a message may be received from the remote node 210, and the testing system 230 may send a response to the message to the remote node 210, as described further below. To illustrate, the response may include an acknowledgement of the message, requested data, results of a requested service, or any combination thereof. In another example, when the testing system 230 is functioning as a client, the node instructions 270 may generate a message that is sent to the remote node 210 (acting as a server), to request data or services of the remote node 210. In response to the message, the remote node 210 may send a message to the testing system 230. To illustrate, the message may include an acknowledgement of the message, the requested data, results of the requested service, or any combination thereof.

When a message is received at the testing system 230, the message may be presented to the protocol stack 244. The local node test apparatus 240, subject to the system configuration applied by the system configuration manager 250 under control of the testing system application connection module 280, receives the message. Before the message is provided to the node instructions 270 to generate a response to the message, the optional script callbacks may enable one of the test script files 260 to modify content of the message or to delay presenting the message to the node instructions 270 for a predetermined period of time. The optional script callbacks also may modify the session state or session options governing operation of the node instructions 270 before, during, or after the node instructions 270 respond to the message.

After the node instructions 270 have generated a response to the message, other optional script callbacks may enable one or more additional test scripts of the test script files 260 to modify the response generated by the node instructions 270, to delay the transmission of the response, or both. The response, as potentially modified, delayed, or otherwise manipulated, may be presented by the local node test apparatus 240 to the protocol stack 244. Content of the response may be sent from the protocol stack 244 via the network interface 242 to the remote node 210 or another node via the network 220.

Messages received by the testing system 230 and responses sent by the testing system 230 may be stored at the testing system 230 (in their original form, modified form, or both). For example, the messages and responses may be stored with the test script files 260 that manipulated the messages or responses. Timing delays imposed on the messages or responses or session parameters (including original parameters and modified parameters) may be stored by the testing system 230 for later analysis and evaluation.

Figure 3:
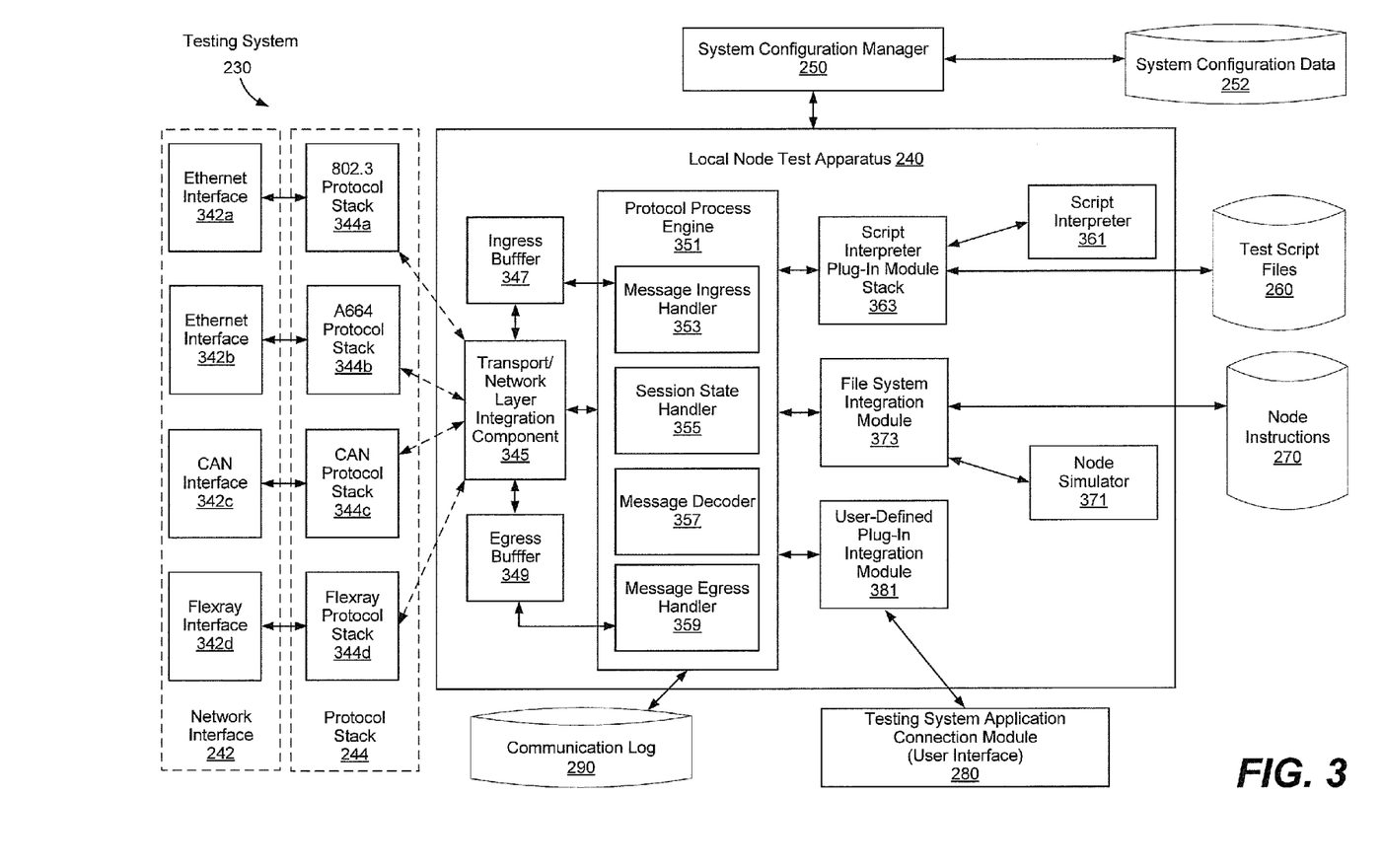
FIG. 3 is a block diagram of an illustrative embodiment of the testing system of FIG. 2.

FIG. 3 is a block diagram of an illustrative embodiment of the testing system 230 of FIG. 2. FIG. 3 provides further detail of the testing system 230, according to a particular embodiment. In particular, FIG. 3 includes further detail regarding the local node test apparatus 240. The local node test apparatus 240 may include computer-executable software instructions stored in a memory of the testing system 230, one or more hardware devices, or a combination of both. The computer-executable instructions may be stored on a tangible (i.e., non-transitory) medium, such as a nonvolatile memory device, from which the instructions may be loaded into the memory of the testing system 230.

The testing system 230 may be interface and protocol agnostic. In other words, the testing system 230 may be used with any of a number of communication protocols that transport data over a number of different kinds of transport media. For example, the testing system 230 may be configured to communicate using an Institute for Electrical and Electronic Engineers (IEEE) 802.3 protocol over an Ethernet network. In this example, the testing system 230 may employ an IEEE 802.3 protocol stack 344a and an Ethernet interface 342a. In another example, the testing system 230 may be configured to communicate using an Aeronautical Radio Inc. (ARINC) avionics protocol according to ARINC Specification 664 Part 7 for data buses known as "A664." The A664 avionics protocol may be used over an Ethernet network, and the testing system 230 may employ an A664 protocol stack 344b and an Ethernet interface 342b. In still another example, the testing system 230 may be configured to communicate using a controller area network (CAN), and the testing system 230 may employ a CAN protocol stack 344c and a CAN interface 342c. In a further example, the testing system 230 may be configured to communicate using a Flexray network, and the testing system 230 may employ a Flexray protocol stack 344d and a Flexray interface 342d. The testing system 230 also or in the alternative may be configured to operate on other types of networks using other types of protocols and interfaces.

The protocol stack 244 may exchange messages with the local node test apparatus 240 via a transport/network layer integration component 345. The transport/network layer integration component 345 may manage the translation of data between the protocol stack 244 and a protocol process engine 351, freeing the protocol process engine 351 from having to manage the lower-layer of data communications. The transport/network layer integration component 345 may receive inbound content (e.g., messages or other data) from the protocol stack 244 and may store the inbound content in an ingress buffer 347. The protocol process engine 351 may retrieve the inbound content from the ingress buffer 347. The transport/network layer integration component 345 may also receive outbound content (e.g., messages or other data) from the protocol process engine 351 via an egress buffer 349.

The protocol process engine 351 may receive system configuration data 252 from a system configuration manager 250. The system configuration data 252 may causes the protocol process engine 351 to emulate a particular node of a network. The protocol process engine 351 may receive instructions from one or more of the test script files 260, as interpreted via a script interpreter 361, via a script interpreter plug-in module stack 363. The script interpreter plug-in module stack 363 may apply test scripts that, for example, modify content of the ingress buffer 347, modify content of the egress buffer 349, modify a session state or session options, cause the protocol process engine 351 to present a message or generate a response to a message when a threshold is satisfied, or any combination thereof. The threshold may specify a quantity of time that is to pass before a particular test script is applied or a quantity of time that is to pass before the particular test script makes a particular modification. Additionally or in the alternative, the threshold may specify a number of instances of an event that are to be permitted to occur before a modification is applied. For example, the number of instances may specify a number of messages to be processed before the test script is implemented or before the particular modification is applied. The threshold may indicate that the script interpreter plug-in module stack 363 is to delay execution of one or more portions of a test script until a predetermined number of messages have been processed by the protocol process engine 351.

The protocol process engine 351 may receive the node instructions 270 interpreted by a node simulator 371 via a file system integration module 373. The file system integration module 373 may apply the node instructions 270 so that the local node test apparatus 240 functions as one of the nodes to be included in the network to facilitate testing under conditions that simulate conditions that may occur during normal operation (i.e., non-test operation) of the network.

The protocol process engine 351 may receive input from the testing system application connection module 280 via a user-defined plug-in integration module 381. The user-defined plug-in integration module may enable testing personnel to control, modify, or study operation of the local node test apparatus 240 or the remote node (not shown in FIG. 3) with which the testing system 230 is communicating.

The protocol process engine 351 may include components that facilitate modification of messages and session parameters, such as a message ingress handler 353, a session state handler 355, a message decoder 357, and a message egress handler 359. Each of the components 353, 355, 357, and 359 may enable a test script of the test script files 260 to modify how the local node test apparatus 240 responds to or interacts with a message or data. In other words, instead of solely executing the node instructions 270 under control of the node simulator 371 and the file system integration module 373 to respond to a message, the components 353, 355, 357, and 359 may enable a test script of one of the test script files 260 to modify content or timing of a message, session state, session options, timing of local node test apparatus 240 in responding to a message, content of a response generated by the local node test apparatus 240, or any combination thereof.

The message ingress handler 353 may enable a test script to modify content of the ingress buffer 347. Modifying the content of the ingress buffer 347, for example, may permit the local node test apparatus 240 to simulate a fault by a remote node or the network that results in presentation of an unexpected message (e.g., a message with errors). The session state handler 355 may enable a test script to change a session state or session options under which the local node test apparatus 240 operates. The message decoder 357 may enable a test script to modify how the local node test apparatus 240 decodes and, thus, responds to a message. The message egress handler 359 may enable a test script to modify content of the egress buffer 349 to test how a remote node responds to unexpected message content.

Figure 4:
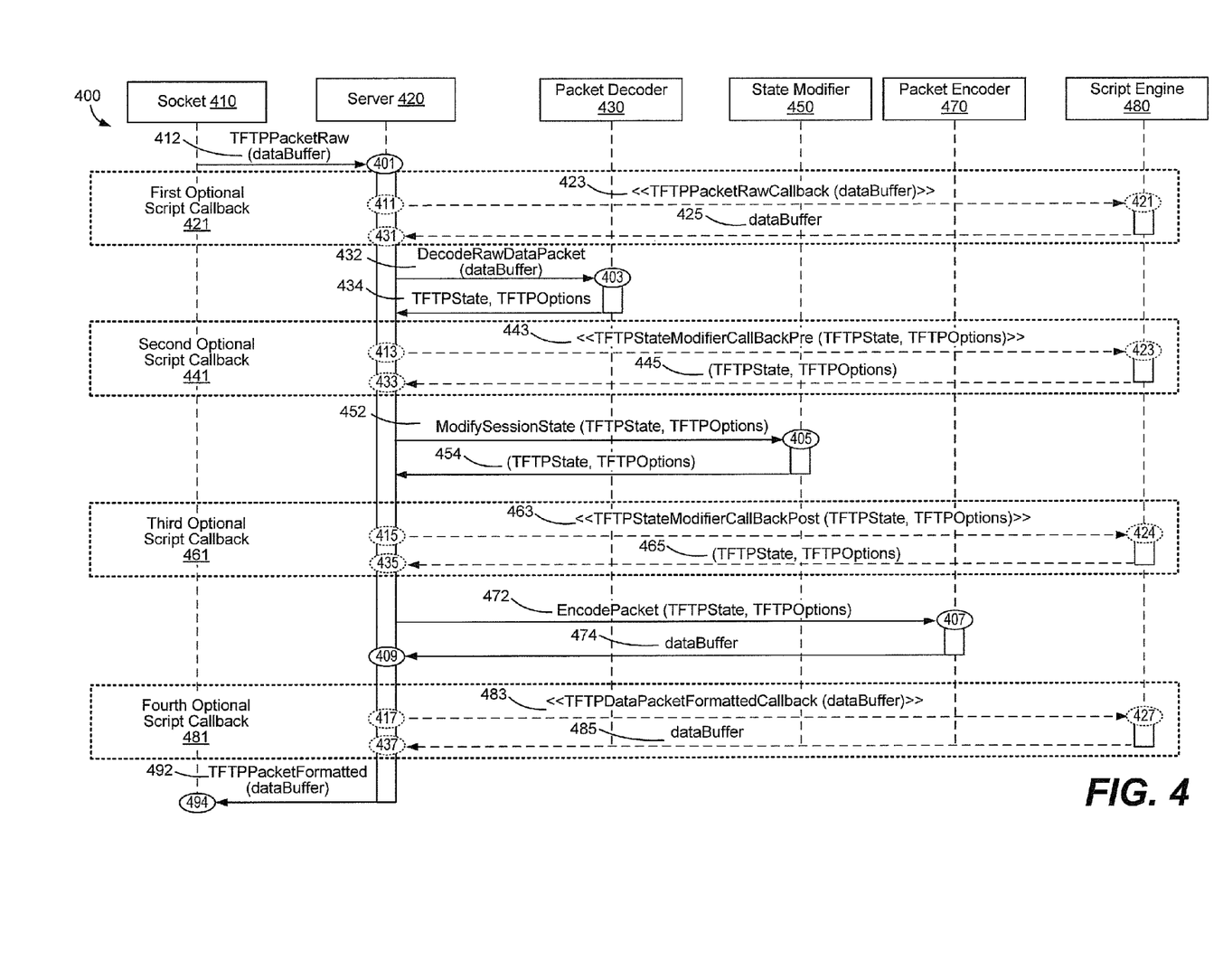
FIG. 4 is a data flow diagram illustrating the operation of a plurality of script callbacks in a testing system.

FIG. 4 is a data flow diagram 400 illustrating operation of a plurality of optional script callbacks in a testing system, such as the testing system 230 of FIGS. 2 and 3. For the sake of illustration, the data flow diagram illustrates operation of the testing system 230 in a network that uses TFTP.

The data flow diagram 400 depicts the flow of data between elements of a node, including a socket 410, a server 420, a packet decoder 430, a state modifier 450, a packet encoder 470, and a script engine 480. One or more optional script callbacks 421, 441, 461, and 481 may be provided to enable implementing test scripts during the data flow. In a conventional node operating without the optional script callbacks 421, 441, 461, and 481, a message or other received data may flow from the socket 410 to the server 420 via a TFTPPacketRaw (dataBuffer) instruction 412, at 401, where "dataBuffer" represent information from the message that is passed using the TFTPPacketRaw instruction 412. The server 420 may then pass content of the dataBuffer to the packet decoder 430 via a DecodeRawDataPacket (dataBuffer) instruction 432, at 403. Note that the server 420, the packet decoder 430, the state modifier 450, and the packet encoder 470 may execute node instructions, such as the node instructions 270, via the protocol process engine 351, the node simulator 371 and the file system integration module 373 of FIG. 3. The optional script callbacks 421, 441, 461, and 481 may enable one or more test scripts of the test script files 260 to be executed by the protocol process engine 351, the script interpreter 361, and the script interpreter plug-in module stack 363 of FIG. 3.

The packet decoder 430 may extract TFTPState and TFTPOptions 434 from dataBuffer. The TFTPState and TFTPOptions 434 may represent requested changes to the protocol state and options, respectively, requested by a remote node, such as the remote node 210 of FIG. 2, that sent the message that was received at the socket 410. Extensions to TFTP may enable nodes to negotiate such state and option changes. For example, the TFTPState may include a standby state, an init state, an active state, a warning state, or another protocol state, which may be changed in response to negotiation of the nodes. The TFTPOptions may include a timeout interval, a blocksize, a transfer size, or another protocol option, which may be changed in response to negation of the nodes.

After the TFTPState and TFTPOptions 434 have been received by the server 420 from the packet decoder 430, the TFTPState and TFTPOptions 434 may be passed from the server 420 to the state modifier 450 to respond to the requested changes via a ModifySessionState (TFTPState, TFTPOptions) instruction 452. Potentially modified state and options may be returned to the server 420 by the State modifier 450 as modified TFTPState and TFTPOptions 454. The server 420 may instruct the packet encoder 470 to encode a response to the message via an EncodePacket (TFTPState, TFTPOptions) instruction 472. The packet encoder 470 may return the response via as dataBuffer 474, at 409. The response then flows from the server 420 to the socket 410 via a TFTPPacketFormatted (dataBuffer) instruction 492, at 494, where the response may be placed in the egress buffer, such as the egress buffer 349 of FIG. 3.

The optional script callbacks 421, 441, 461, and 481 may enable test scripts to make changes at various locations within the data flow described above. For example, the first scripting callback 421 may enable a testing script to modify content of packets received at an ingress buffer, such as the ingress buffer 347 of FIG. 3. The second scripting callback 441 may enable a test script to modify how packets are decoded. The third scripting callback 461 may enable a test script to modify session states, session options, or both. The fourth scripting callback 481 may enable a test script to modify encoding of packets at an egress buffer, such as the egress buffer 349 of FIG. 3. The optional script callbacks 421, 441, 461, and 481 may be implemented by a component of the protocol process engine 351 of FIG. 3, such as the message ingress handler 353, the session state handler 355, the message decoder 357, the message egress handler 359, or a combination thereof. The optional script callbacks 421, 441, 461, and 481 enable data to be intercepted and passed to the script engine 480 where a test script may modify the data or a response of a testing system to the data. Because the optional script callbacks 421, 441, 461, and 481 are optional, test scripts may be associated with one, some, all, or none of the optional script callbacks 421, 441, 461, and 481. If no test script is associated with a particular optional script callback 421, 441, 461, and 481, the data flows transparently through the particular optional script callback 421, 441, 461, or 481. Thus, the optional script callbacks 421, 441, 461, and 481 are represented in FIG. 4 with dotted lines, as are points at which data may be intercepted by the optional script callbacks 421, 441, 461, and 481 and passed to the script engine 480 for modification, as described below.

In operation, with one or more of the optional script callbacks 421, 441, 461, 481 present, data flow may proceed as follows. An inbound message from a remote node, such as the remote node 210 of FIG. 2, may be received at the socket 410 and may be passed to the server 420 via the TFTPPacketRaw (dataBuffer) instruction 412. Thus, the TFTPPacketRaw (dataBuffer) instruction 412 may relay content of the ingress buffer, such as the ingress buffer 347 of FIG. 3, as "dataBuffer". When the first optional script callback 421 is not used by one of the test scripts, at 401, the TFTPPacketRaw (dataBuffer) instruction 412 passes the dataBuffer to the packet decoder 430, at 403, via the DecodeRawDataPacket (dataBuffer) instruction 432.

However, when the first optional script callback 421 is invoked by one of the test scripts, at 411, the TFTPPacketRaw (dataBuffer) instruction 412 is intercepted by the first optional script callback 421 by a TFTPPacketRawCallback (dataBuffer) instruction 423. The script engine 480 then permits modification of dataBuffer, at 421, to generate modified content of dataBuffer 425 which is returned, at 431, to the server 420. Note that the dataBuffer is not necessarily modified by the test script. For example, the test script may only modify the dataBuffer after a threshold number of messages have been received, after a threshold period of time has passes, or after some other threshold is satisfied.

The DecodeRawDataPacket (dataBuffer) instruction 432 then passes the dataBuffer to the packet decoder 430 to act on the content of dataBuffer 425, which may have been modified by the script engine 480 using the first optional script callback 421. The packet decoder 430 may extract TFTPState and TFTPOptions 434 based on the dataBuffer.

When the second optional script callback 441 is not used by one or more of the test scripts, the TFTPState and TFTPOptions 434 may be sent from the server 420 to the state modifier 450, at 405, via the ModifySessionState (TFTPState, TFTPOptions) instruction 452. When the second optional script callback 441 is invoked by one or more of the test scripts, at 413, the TFTPState and TFTPOptions 434 may be intercepted and sent to the script engine 480 by the second optional script callback 441 by a TFTPStateModifierCallbackPre (TFTPState, TFTPOptions) instruction 443. The script engine 480 then may modify TFTPState and TFTPOptions, at 423, or may return the TFTPState and Options unmodified to the server 420 as TFTPState or TFTPOptions 445, at 433. The server 420 may instruct the state modifier 450 via the ModifySessionState (TFTPState, TFTPOptions) instruction 452, at 405, to generate modified TFTPState and TFTPOptions 454.

When the third optional script callback 461 is not used by one of the test scripts, the TFTPState and TFTPOptions 454 may be sent to the packet encoder 470 via the EncodePacket (TFTPState, TFTPOptions) instruction 472, at 407. When the third optional script callback 461 is invoked by one of the test scripts, at 415, TFTPState and TFTPOptions 454 may be intercepted and sent to the script engine 480 by a TFTPStateModifierCallbackPost (TFTPState, TFTPOptions) instruction 463. The script engine 480 may enable a test script to modify the TFTPState and TFTPOptions, at 424. Alternately, the test script may not modify the TFTPState and TFTPOptions (e.g., when a threshold is not satisfied). TFTPState and TFTPOptions 465, either modified or unmodified, may be sent from the script engine 480 to the server 420, at 435.

The server 420 may send the TFTPState and TFTPOptions 465 to the packet encoder 470 via the EncodePacket (TFTPState, TFTPOptions) instruction 472, at 407. The packet encoder 470 may generate a response to the message received via the socket 410, subject to any modifications made by one or more of the test script via the first, second and/or optional script callbacks 421, 441, 461. The packet encoder 470 may return the response to the server 420 as dataBuffer 474, at 409.

When the fourth optional script callback 481 is not used by one of the test scripts, the sever 420 may send content of the dataBuffer 474 to the socket 410 via a TFTPPacketFormatted (dataBuffer) instruction 492, at 494, to present an outbound message to an egress buffer, such as the egress buffer 349 of FIG. 3. When the fourth optional script callback 481 is invoked by one of the test scripts, at 417, the content of the dataBuffer 474 may be intercepted by the fourth optional script callback 481 and sent to the script engine 480 by a TFTPDataPacketFormattedCallback (dataBuffer) instruction 483. The script engine 480 may enable a test script to modify the content of the dataBuffer 474, at 427, to generate content of dataBuffer 485. Alternately, the test script may not modify content of the dataBuffer 474 (e.g., when a threshold of the test script is not satisfied). The content of dataBuffer 485 may be sent to the server 420, at 437. The content of the dataBuffer 485 may be presented to the socket 410 via the TFTPPacketFormatted (dataBuffer) instruction 492 to present the outbound message via the egress buffer, at 494.

The data flow diagram 400 depicts operation of a server node. That is, the node is responding to a message from another node (e.g., a client node). Thus, one of the elements depicted in the data flow diagram 400 is the server 420, which may implement node instructions to perform tasks associated with the node. When a testing system is a client, the server 420 may be replaced with a client element. In this circumstance, the data flow diagram 400 may start with preparation of a message to be sent to a server to request data or services from the server, rather than responding to a message from another node. Thus, the data flow diagram 400 for the client may begin at the second optional script callback 441 and may continue through transferring TFTPPacketFormatted (dataBuffer) 492 to the socket 410, at 494, as the client generates a message. When the client receives a response to the message, the client may receive the response at socket 410, which may send the message to the client via the TFTPPacketRaw (dataBuffer) instruction 412. Thus, in the client case, the instructions and steps performed may be similar; however, the data flow diagram 400 may start at a different point.

In sum, interposing the optional script callbacks 421, 441, 461, 481 enables test scripts to be applied to content of the dataBuffer, TFTPState, and TFTPOptions as each may be received or generated throughout ordinary processing by node instructions. In addition, the optional script callbacks 421, 441, 461, and 481 may be invoked to interpose delays. For example, the test scripts invoke one or more of the optional script callbacks 421, 441, 461, and 481 at predetermined points, e.g., when particular thresholds are satisfied. To illustrate, a fault or an injection attack may be simulated every time that a cycle of the data flow diagram 400 is initiated. As a result, the testing system may expose flaws in node instructions executed by the server 420 (or a client in the client case described above). The testing system may also expose flaws in a remote node that communicates with the server 420 (or the client) via the socket 410. When the fault or injection attack is only implemented occasionally, e.g., when the particular threshold is satisfied, additional flaws in the node instructions or remote node may be identified. For example, the remote node may be been configured to address if the flaw occurred during a first cycle or during every cycle, but not if the flaw occurs subsequently or intermittently.

In a particular embodiment, the testing system 230 may implement the data flow described with reference to the data flow diagram 400 to expose unforeseen network flaws. For example, Table 2-1 of the Radio Technical Commission for Aeronautics (RTCA) RTCA/DO-254 specification for "DESIGN ASSURANCE GUIDANCE FOR AIRBORNE ELECTRONIC HARDWARE" recognizes different levels of devices, including Level A, Level B, Level C, and Level D devices, in order of descending rank. According to the RTCA/D0-254 specification, lower-ranked devices should not be able to disrupt operation of a higher-ranked device. Nonetheless, using the testing system 230, simulated faults or injection attacks may be used to demonstrate flaws that enable lower ranked devices to disrupt the operation of higher ranked devices.

For sake of illustration, code of an exemplary set of optional script callbacks is listed below. The set of optional script callbacks is created for the Lua script interpreter, although the scripting commands are similar to those that may be used with other script interpreters. Block and inline comments describe the function of each of the routines to enable the modifications that may be made by the optional script callbacks 421, 441, 461, and 481 of FIG. 4:

```
-- ***************************************************************
-- Default Template for TFTP Test Apparatus
-- ***************************************************************
-- compile with
-- luac.exe -o tftp_template.out tftp_template.lua
-- ***************************************************************
-- Global Variables
-- ***************************************************************
ScriptDisabled = -2147483648
ScriptEnabled  = 0
-- ***************************************************************
-- Default Tables
-- ***************************************************************
TftpOptionList =
{
    blksize  = 512,    -- octets
    timeout  = 2,      -- seconds
    tsize    = -1      -- total size of octets of file/memory block
}
TftpTransferMode =
{
    TFTP_MODE_ASCII   = 1,
    TFTP_MODE_MAIL    = 2,
    TFTP_MODE_OCTET   = 3
}
TftpSessionContext =
{
    SessionFileName       = nil,
    SessionTransferMode   = nil,
    SessionCurrentState   = nil,
    SessionTimeOut        = nil,
    SessionErrorCode = nil,
    SessionErrorMessage   = nil
}
-- ***************************************************************
-- End of Global Variables
-- ***************************************************************
-- ***************************************************************
-- Callback Functions
-- ***************************************************************
-- ***************************************************************
-- *** Callback function to handle any preprocess setup
-- *** Arguments: TftpSessionContext
-- *** Returns: TftpSessionContext
-- ***************************************************************
function TftpSessionCallback_Preprocess(TftpSessionContext)
    -- Setup the callback script plug-in states
    TftpSessionContext["ScriptCallbackEnabled_PreProcess"]
        = ScriptDisabled;
    TftpSessionContext["ScriptCallbackEnabled_RawBuffer"]
        = ScriptDisabled;
    TftpSessionContext["ScriptCallbackEnabled_StateModPre"]
        = ScriptDisabled;
    TftpSessionContext["ScriptCallbackEnabled_StateModPost"]
        = ScriptEnabled;
    TftpSessionContext["ScriptCallbackEnabled_FormattedBuffer"]
        = ScriptDisabled;
    TftpSessionContext["ScriptCallbackEnabled_PostProcess"]
        = ScriptDisabled;
    return TftpSessionContext
end
-- ***************************************************************
-- *** Callback function to handle ingress of raw TFTP
-- *** data packet, manipulate, then return the buffer
-- *** Returns: raw databuffer
-- ***************************************************************
function TftpSessionCallback_Buffer_Raw(dataBuffer)
    return dataBuffer
end
-- ***************************************************************
-- *** Callback function to handle ...
-- *** Returns: ...
-- ***************************************************************
function TftpSessionCallback_StateMod_Pre( tftpState, tftpOptions )
    print( " << TftpSessionCallback_StateMod_Pre >>" )
    return tftpState
```

```
end
-- ***************************************************************
-- *** Callback function to handle ...
-- *** Returns: ...
-- ***************************************************************
function TftpSessionCallback_StateMod_Post( tftpState, tftpOptions )
    return tftpState
end
-- ***************************************************************
-- *** Callback function to handle egress of formatted
-- *** TFTP data packet, manipulate, then return the buffer
-- *** Returns: raw databuffer
-- ***************************************************************
function TftpSessionCallback_Buffer_Formatted(dataBuffer)
    return dataBuffer
end
-- ***************************************************************
-- *** Callback function to handle any post processing
-- *** Returns: tbd
-- ***************************************************************
function TftpSessionCallback_Postprocess(TftpSessionContext)
    return TftpSessionContext
end
-- ***************************************************************
-- End of Callback Functions
-- ***************************************************************
```

Figure 5:
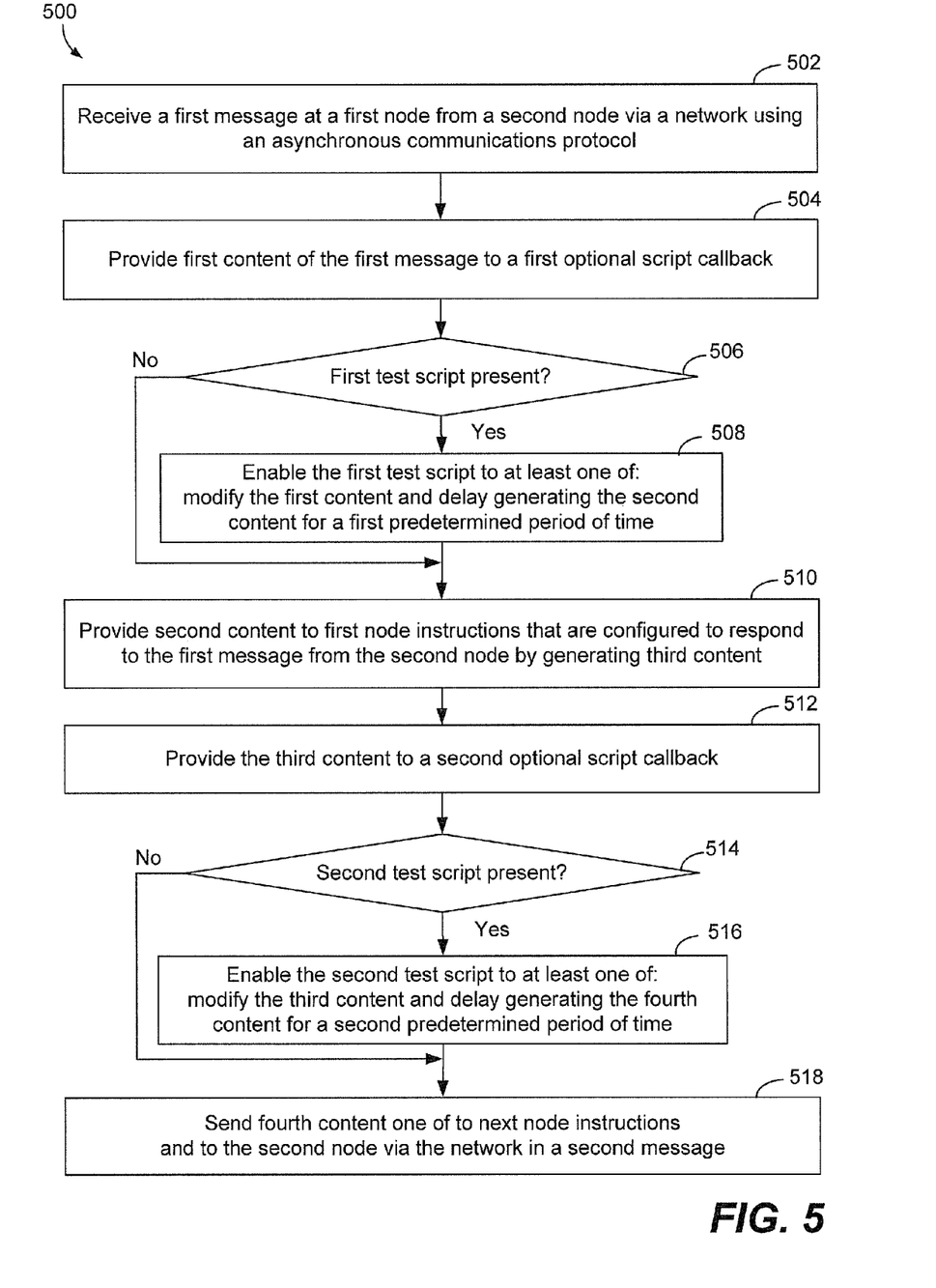
FIG. 5 is a flow diagram of an illustrative embodiment of a method of testing one or more components in a network.

FIG. 5 is a flow diagram of an illustrative embodiment of a method 500 of testing one or more components in a network. The method 500 may include receiving a first message at a first node from a second node via a network using an asynchronous communications protocol, at 502. TFTP is one example of an asynchronous protocol that may be used by devices participating in a communications network that may be tested using embodiments of the disclosure. However, other message-based protocols also may be tested using embodiments disclosed herein. In the TFTP example of FIG. 4, the message may be received via an ingress buffer (e.g., the ingress buffer 347 of FIG. 3. Content of the first message may be provided to a first optional script callback, at 504. For example, as described with reference to the data flow diagram 400 of FIG. 4, the optional script callbacks 421, 441, 461, and 481 may intercept and modify content of the dataBuffer, TFTPState, or TFTPOptions at 411, 413, 415, and 417, respectively.

As described with reference to FIG. 4, the optional script callbacks 421, 441, 461, and 481 may not be used at all, or only applied when a time or count threshold is reached. When a first test script is present, at 506, the first test script may be enabled to modify the first content to generate second content, to delay generating the second content for a first predetermined period of time, or both, at 508. For example, as described with reference to FIG. 4, the first optional script callback 421 may intercept content of the dataBuffer received via the socket 410. A test script, such as a test script of the test script files 260 of FIGS. 2 and 3, may modify content of the dataBuffer or introduced a timing delay before the content of dataBuffer is presented to the server 420.

Returning to FIG. 5, when no first test script is present, at 506, or after the content is modified or delayed, at 508, the second content (which may include unmodified or modified first content, or delayed unmodified or modified first content) may be provided to first node instructions. For example, if there is no test script that engages the first optional script callback 421 to modify the content of the dataBuffer or to introduce a delay in presenting the content of the dataBuffer, or if a threshold of the test script is not satisfied, the content of the dataBuffer may be passed to the packet decoder 430 via the DecodeRawDataPacket (dataBuffer) instruction 432.

Returning to FIG. 5, the first node instructions may be configured to respond to the first message from the second node by generating third content, at 510. For example, the packet decoder 430 may be configured to respond to the DecodeRawDataPacket (dataBuffer) instruction 432 by extracting TFTPState and TFTPOptions 434 from the content of the dataBuffer.

Returning again to FIG. 5, the third content may be provided to a second optional script callback, at 512. For example, in the data flow diagram 400 of FIG. 4, after TFTPState and TFTPOptions 434 is extracted from the content of the dataBuffer by the packet decoder 430, the TFTPState and TFTPOptions 434 may be passed to the second optional script callback 441 where one or more test scripts may intercept and modify TFTPState and TFTP options 434, at 413.

Returning to FIG. 5, when a second test script is present, at 514, the second test script may be enabled to modify the third content to generate fourth content, to delay generating the fourth content for a first predetermined period of time, or both, at 518. For example, in the data flow diagram 400 of FIG. 4, the second optional script callback 441 may enable a test script executed by the script engine 480 to apply a modification to or introduce a delay in generating the TFTPState and TFTPOptions 445, at 433. Returning to FIG. 5, when no second test script is present, at 514, or after the third content is modified or delayed, at 516, the fourth content (which may include unmodified or modified third content, or delayed unmodified or modified third content) may be sent to a next set of node instructions, to the second node via the network in a second message, or both. For example, in the data flow diagram 400 of FIG. 4, after the second optional script callback 441 enables modification or delay in generating the TFTPState and TFTPOptions 445, at 433, the TFTPState and TFTPOptions 445 may be passed to a next set of node instructions where control is passed to the state modifier 450 via the ModifySessionState (TFTPState, TFTPOptions) instruction 452, at 405. According to embodiments of the disclosure, the method 500 of FIG. 5 may continue for as many sets of optional script callbacks and node instructions that may be presented and the method 500 may continue for any desired number of message transactions.

The systems and methods disclosed enable rigorous testing of remote devices, of instructions executing on a local node, or both. For example, when the communication system 200 of FIG. 2 includes an onboard communication system of a vehicle, an embodiment of a testing system may be installed in addition to or in place of another network device. Conventionally, devices on the network may be tested by activating the devices to determine whether the devices appear to operate as intended when other devices on the network are also operating as intended. However, such conventional testing may not expose flaws that may result in one device from an unexpected fault of another device. In particular, intermittent or sporadic errors that may result from transient device errors (e.g., errors caused by voltage surges or manufacturing flaws), delays caused by network traffic or device malfunctions, or other potential errors may generate unexpected results when the communication system is tested as a whole. Moreover, it may be difficult to anticipate or test how a failure in one device may result in a failure in another device on the network. It may be difficult to foresee or to simulate such errors. In addition, for commercial aviation, it is desirable to test systems for their susceptibility to attacks from malicious software intended to disrupt, disable, or compromise critical systems.

Using embodiments of the disclosure herein, test scripts can be created in a simple scripting language to simulate many types of errors. As described, the test scripts may be created to modify raw data stored in either an ingress buffer or an egress buffer of the test system. For example, when a testing system is used to simulate operation of an avionics device, content of an outbound message may be modified to report data values or to negotiate a protocol states or options that are beyond any parameters that one or more other nodes may be configured to expect. It may be difficult or impractical to make a node in a testing system generate such an unexpected message. However, unexpected messages can be generated easily using embodiments disclosed herein. Introducing unexpected messages may, for example, enable a Level C device to expose a flaw in a presumably inviolable Level A device.

Figure 6:
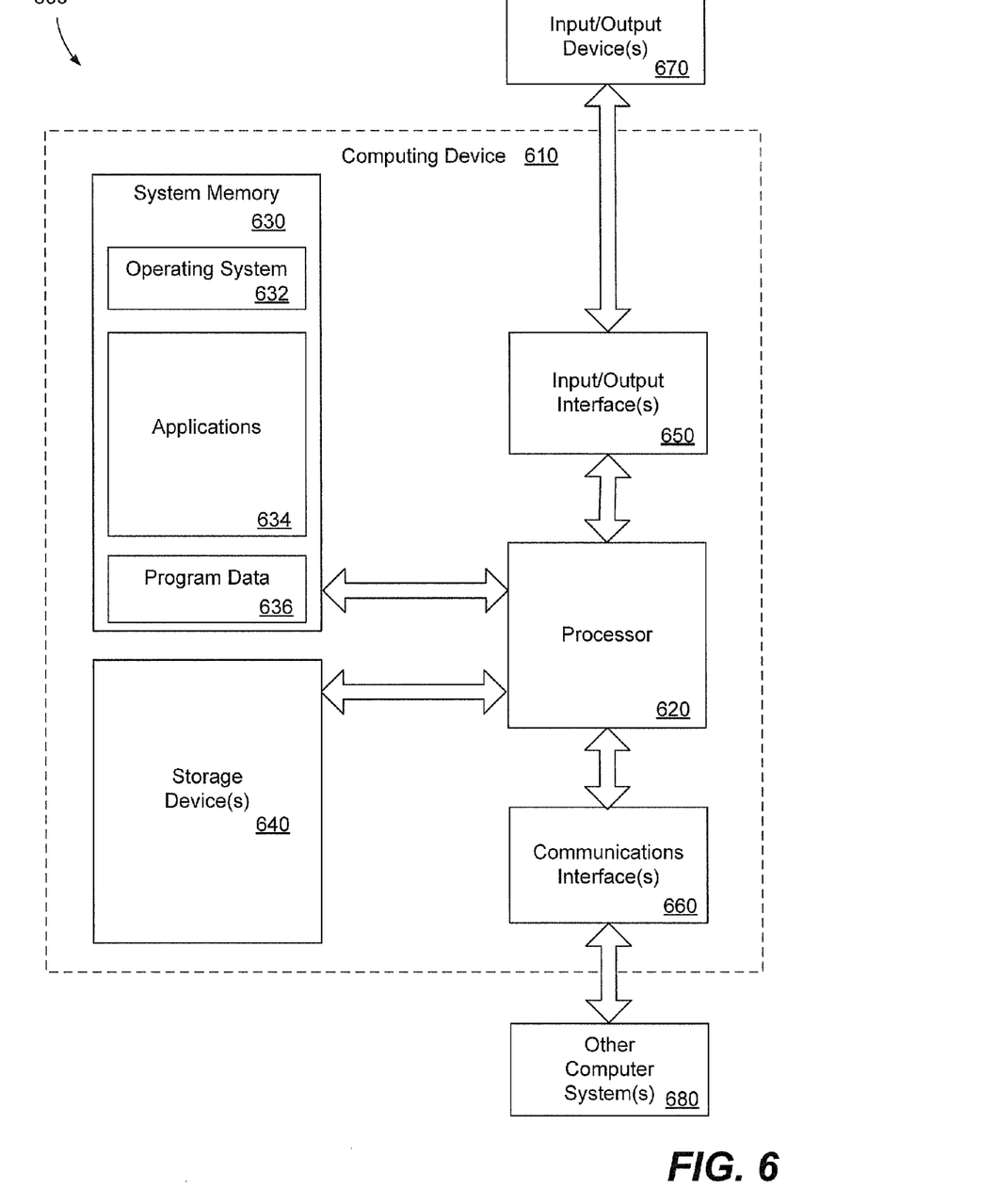
FIG. 6 is a block diagram of a general purpose computer system operable to perform computer-implemented methods or process computer-executable instructions according to a particular embodiment.

FIG. 6 is a block diagram of a general purpose computer system operable to perform computer-implemented methods or process computer-executable instructions according to a particular embodiment of testing node instructions or a node that operate in a network environment. The computer system 600 may be installed in an operational network, such as a network aboard an aircraft or another vehicle. Alternatively, the computer system 600 may be used in a simulated environment to test devices that may be used in an operational network. In an illustrative embodiment, a computing device 610 of the computing system 600 may include at least one processor 620. The processor 620 may be configured to execute node instructions or callback scripts to respond to or prepare messages as described with reference to FIGS. 1-5. The processor 620 may communicate with a system memory 630, one or more storage devices 640, and one or more input devices 670, via input/output interfaces 650.

The system memory 630 may include volatile memory devices, such as random access memory (RAM) devices, and nonvolatile memory devices, such as read-only memory (ROM), programmable read-only memory, and flash memory. The system memory 630 may include an operating system 632, which may include a basic input/output system for booting the computing device 610 as well as a full operating system to enable the computing device 610 to interact with users, other programs, and other devices. The system memory 630 may also include one or more application programs 634, such as instructions for configuring the computing device 610 to distribute vehicle power, as previously described.

The processor 620 also may communicate with one or more storage devices 640. The storage devices 640 may include nonvolatile storage devices, such as magnetic disks, optical disks, or flash memory devices. In an alternative embodiment, the storage devices 640 may be configured to store the operating system 632, the applications 634, the program data 636, or any combination thereof. The processor 620 may communicate with the one or more communication interfaces 660 to enable the computing device 610 to communicate with other computing systems 680.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A system comprising:
    a processor;
    a network interface operably coupled to the processor and configured to send and receive messages via a network using an asynchronous computer communication protocol;
    two or more buffers, including an ingress buffer to store first content corresponding to a received message and an egress buffer to store second content corresponding an outgoing message;
    a memory accessible to the processor, the memory including
        first node instructions that are executable by the processor to implement one or more functions of a first node; and
        one or more script callbacks that are executable by the processor to at least one of:
            provide the first content to a test script to be modified before the first content is provided to the first node instructions from the ingress buffer; and
            provide the second content to the test script to be modified before the outgoing message is provided to the egress buffer.

2. The system of claim 1, wherein at least one of the one or more script callbacks is executable by the processor to introduce a timing delay before the first content is provided to the first node instructions.

3. The system of claim 1, wherein at least one of the one or more script callbacks is executable by the processor to introduce a timing delay before the outgoing message is sent.

4. The system of claim 1, wherein at least one of the one or more script callbacks is executable by the processor to modify session state information of the first node, the session state information indicating a session state of the asynchronous computer communication protocol.

5. The system of claim 4, wherein the session state information of the first node includes one or more of a standby state, an init state, an active state, an inactive state, and a warning state.

6. The system of claim 1, wherein at least one of the one or more script callbacks is executable by the processor to modify session options of the first node, the session options indicating options to be used to send and receive the messages using the asynchronous computer communication protocol.

7. The system of claim 6, wherein the session options include one or more of a timeout interval, a blocksize, and a transfer size.

8. The system of claim 1, wherein the asynchronous computer communication protocol includes trivial file transfer protocol.

9. The system of claim 1, wherein the memory further includes instructions executable by the processor to generate a communication log that includes an output of the first node instructions and one or more messages received from a second node.

10. The system of claim 1, wherein the network includes an onboard communications network of a vehicle.

11. A non-transitory computer-readable medium storing instructions that, when executed by a computer system, cause the computer system to:
    provide first data related to asynchronous computer communications to a test script;
    receive modified first data from the test script, wherein the first data is modified by the test script to generate the modified first data;
    generate a first message based on the modified first data;
    send the first message to a second computer system using an asynchronous computer communications protocol;
    receive a second message from the second computer system using the asynchronous computer communications protocol; and
    store content of the first message and the second message to enable a determination of an effect of communicating the modified first data to the second computer system using the asynchronous computer communications protocol.

12. The non-transitory computer-readable medium of claim 11, wherein the instructions are further executable by the computer system to receive the first data via a third message using the asynchronous computer communications protocol before providing the first data to the test script.

13. The non-transitory computer-readable medium of claim 11, wherein the instructions are further executable by the computer system to receive the first data via a fourth message using the asynchronous computer communications protocol and to delay sending for a predetermined time period a fifth message sent in response to the fourth message.

14. The non-transitory computer-readable medium of claim 11, wherein the instructions are further configured to:
    provide second data to the test script before the first data is provided to the test script; and
    receive unmodified second data from the test script when the second data is provided to the test script before a threshold of the test script is satisfied.

15. The non-transitory computer-readable medium of claim 14, wherein the threshold includes one of a time threshold and a count of a number of instances for which data is provided to the test script.

16. The non-transitory computer-readable medium of claim 11, wherein the asynchronous computer communications protocol is trivial file transfer protocol.

17. A computer-executable method, comprising:
    receiving a first message at a first node from a second node via a network using an asynchronous computer communications protocol;
    providing first content of the first message to a first script callback, wherein the first script callback is configured to generate second content by enabling a first test script to at least one of modify the first content and delay generating the second content for a first predetermined time period;

providing the second content to first node instructions configured to respond to the first message from the second node by generating third content;

providing the third content to a second script callback, wherein the second script callback is configured to generate fourth content by enabling a second test script to at least one of modify the third content and delay generating the fourth content for a second predetermined time period; and sending the fourth content to the second node via the network in a second message.

18. The computer-executable method of claim 17, wherein the first test script generates the second content in response to determining that a threshold of the first test script is satisfied.

19. The computer-executable method of claim 17, further comprising:

providing a first set of one or more protocol parameters to a third script callback, wherein the third script callback is configured to enable a third test script to generate a second set of one or more protocol parameters; and providing the second set of one or more protocol parameters to the first node instructions.

20. The computer-executable method of claim 19, wherein the first set of one or more protocol parameters includes at least one of a protocol state and one or more protocol options.

* * * * *